(12) United States Patent
Yavuz et al.

(10) Patent No.: US 7,075,913 B1
(45) Date of Patent: Jul. 11, 2006

(54) HYBRID DATA RATE CONTROL IN CDMA CELLULAR WIRELESS SYSTEMS

(75) Inventors: Mehmet Yavuz, Plano, TX (US); Farid T. Khafizov, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 931 days.

(21) Appl. No.: 10/106,464

(22) Filed: Mar. 26, 2002

(51) Int. Cl.
*H04B 7/216* (2006.01)
(52) U.S. Cl. .................................. 370/335; 370/342
(58) Field of Classification Search ................ 370/328, 370/329, 335, 342, 431, 441, 351–356, 465, 370/338, 349
See application file for complete search history.

(56) References Cited

U.S. PATENT DOCUMENTS

| | | | | |
|---|---|---|---|---|
| 2003/0123414 A1* | 7/2003 | Tong et al. | ................. | 370/337 |
| 2003/0142656 A1* | 7/2003 | Padovani et al. | ........... | 370/347 |
| 2005/0201368 A1* | 9/2005 | Periyalwar et al. | ......... | 370/356 |
| 2005/0208961 A1* | 9/2005 | Willenegger | ................. | 455/522 |
| 2005/0226173 A1* | 10/2005 | Strawczynski et al. | ..... | 370/278 |
| 2005/0265430 A1* | 12/2005 | Ozluturk et al. | ............ | 375/145 |

* cited by examiner

*Primary Examiner*—Ajit Patel
(74) *Attorney, Agent, or Firm*—Garlick, Harrison & Markison, LLP; Bruce Garlick

(57) ABSTRACT

A method for servicing high-speed data communications in a cellular wireless communication system includes the wireless transmission of data at a higher data rate than is supportable considering constraints of the prior art. The cellular wireless communication system determines a supportable data rate for a wireless subscriber unit based upon available base station transmit power resources and other resources. A data rate multiplier is then determined that is greater than 1 and will typically have a value of 2, 4, 6, 8, . . . , N, wherein N is an integer. With the data rate multiplier determined, a serviced data rate for the transmissions to the wireless subscriber unit is equal to the supportable data rate times the data rate multiplier, i.e., serviced data rate=N * supportable data rate, such that the serviced data rate is a multiple of the supportable data rate. Data is then transmitted from the base station to the wireless subscriber unit at the serviced data rate.

20 Claims, 9 Drawing Sheets

HYBRID DATA RATE CONTROL IN CDMA CELLULAR WIRELESS SYSTEMS

BACKGROUND

1. Technical Field

The present invention relates generally to cellular wireless communication systems; and more particularly to the transmission of high-speed data communications in cellular wireless communication systems.

2. Related Art

Cellular wireless communication systems support wireless communication services in many populated areas of the world. While cellular wireless systems were initially constructed to service voice communications, they are now called upon to support data communications as well. The demand for data communication services has exploded with the acceptance and widespread use of the Internet. While data communications have historically been serviced via wired connections, wireless users are now demanding that their wireless units also support data communications. Many wireless subscribers now expect to be able to "surf" the Internet, access their email, and perform other data communication activities using their cellular phones, wireless personal data assistants, wirelessly linked notebook computers, and/or other wireless devices. The demand for wireless system data communications will only increase with time. Thus, wireless systems are currently being created/modified to service these burgeoning data communication demands.

Significant performance issues exist when using a wireless system to service data communications. Wireless systems were initially designed to service the well-defined requirements of voice communications. Generally speaking, voice communications require a sustained bandwidth with minimum signal-to-noise ratio (SNR) and continuity requirements. Data communications, on the other hand, have very different performance requirements. Data communications are typically bursty, discontinuous, and may require a relatively high bandwidth during their active portions. To understand the difficulties in servicing data communications within a wireless system, consider the structure and operation of a cellular wireless system.

Cellular wireless systems include a "network infrastructure" that wirelessly communicates with wireless subscriber units within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, a wireless subscriber unit communicates with one (or more) of the base stations. A BSC coupled to the serving base station routes voice communications between the MSC and the serving base station. The MSC routes the voice communication to another MSC or to the public switched telephone network (PSTN). BSCs route data communications between a servicing base station and a packet data network that may couple to the Internet.

The wireless link between the base station and the wireless subscriber unit is defined by one of a plurality of operating standards, e.g., AMPS, TDMA, CDMA, GSM, etc. These operating standards, as well as new 3G and 4G operating standards, define the manner in which the wireless link may be allocated, setup, serviced and torn down. These operating standards must set forth operations that will be satisfactory in servicing both voice and data communications. Each of these next generation systems will be called upon to support high-speed data communications.

CDMA systems are interference limited. Thus, as the number of users serviced by a cell or sector increases, the effective data rate that may be provided to each user decreases. Generally speaking, the data rate that may be supported for any particular user is directly related to the signal quality that may be provided to the user. The signal quality that may be provided to a particular user is typically characterized as the signal- to noise ratio of the user's received signal, i.e., carrier-energy to Noise (Eb/No). In order to provide a higher data rate to a particular user, the user may be allocated a higher transmit power to support higher symbol rates. However, the higher transmit power signal intended for the particular user appears as noise to other users, thereby decreasing the signal quality (Eb/No) of the other users.

A need therefore exists to increase the data throughput provided by a cellular wireless system without increasing the transmit power required for serviced data transmissions.

SUMMARY OF THE INVENTION

Thus, to overcome the shortcomings of the prior operations, among other shortcomings, a method for servicing high-speed data communications in a cellular wireless communication system according to the present invention includes the wireless transmission of data at a higher data rate than is supportable considering constraints of the prior art. A method of the present invention first determines that a wireless subscriber unit requires data service by the cellular wireless communication system. Then, the cellular wireless communication system determines a supportable data rate for the wireless subscriber unit based upon available base station power resources. As is generally known, the quality of a signal that may be provided to a wireless subscriber unit will determine a data rate that may be supported. Generally speaking, for a particular supported signal quality and a budgeted Frame Error Rate (FER), and also considering available resources, a supportable data rate is selected. The selection of a supportable data rate may be determined using available techniques, such as those provided with Radio Resource Management (RRM) operations.

However, according to the present invention, the supportable data rate is not used for the forward link transmissions. With the present invention, a data rate multiplier is determined for the particular wireless subscriber unit. This data rate multiplier is greater than 1 and will typically have a value of 2, 4, 6, 8, . . . , N, wherein N is an integer. With the data rate multiplier determined, a serviced data rate for the transmissions to the wireless subscriber unit is equal to the supportable data rate times the data rate multiplier, i.e., serviced data rate=N * supportable data rate, such that the serviced data rate is a multiple of the supportable data rate. However, the serviced data rate can be no greater than a maximum data rate supported by a servicing system. Data is then transmitted from the base station to the wireless subscriber unit at the serviced data rate.

Further, according to the present invention, each data frame of the high-speed data communication is scheduled for transmission a plurality of times. According to one embodiment of this operation, each data frame of the high-speed data communication is scheduled for transmission twice, consistent with N=2 operations. The system of the present invention also uses an Automatic Retransmission request (ARQ) scheme in which a servicing base station will receive an acknowledgement (ACK) or negative acknowledgement (NAK) response from the wireless subscriber unit upon its successful or unsuccessful receipt of each particular data frame.

For a first transmission of a particular data frame of the high-speed data communication, the wireless subscriber unit receives the data frame and attempts to successfully extract data contained in the data frame. If such operation is successful, the wireless subscriber unit responds to the base station with an ACK. If the operation is unsuccessful, the wireless subscriber unit responds to the base station with a NAK. Upon receipt of a NAK, the base station retransmits the particular data frame within its second scheduled transmission time slot.

However, if the wireless subscriber unit responds to the base station with a positive acknowledgment, i.e., ACK, the base station does not retransmit the data frame to the wireless subscriber unit within the second scheduled transmission time slot. In such case, during the time slot scheduled for the second transmission of the data frame, the base station sets its transmit power gain to zero so that no transmission of the particular data frame is made during that schedule. Making no transmission during the scheduled time slot reduces system interference from the prospective of other wireless subscriber units operating within the system.

A significant benefit of the operation of the present invention is realized by this reduction in interference during scheduled time slots in which no transmissions are made. Such is the case because the probability of successful receipt of transmissions by other wireless subscriber units increases. However, another significant benefit is realized because the effective data throughput for operation according to the present invention is as good for operation according to prior techniques in which lower data rates are serviced. For example, according to one operation of the present invention in which a data rate of 76 kbps is employed, as contrasted to a prior operation in which a 38 kbps data rate is employed, the same throughput will be realized with operation according to the present invention even though a significant number of transmission periods are not employed for transmissions. In such case, while the throughput rate is equal with the operation according to the present invention compared to prior operations, system-wide interference is reduced due to the idle transmission periods.

Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1:
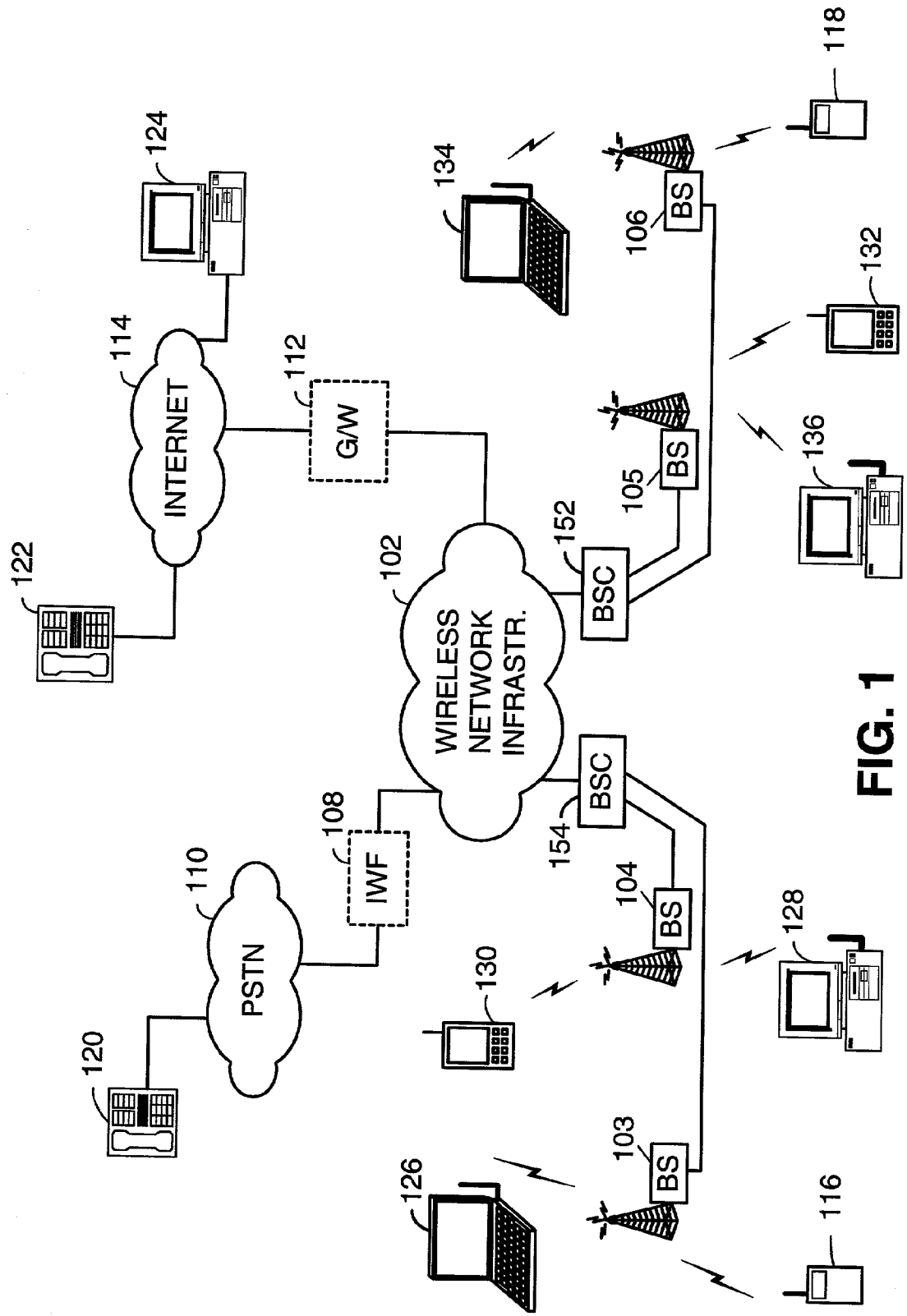
FIG. 1 is a system diagram illustrating a portion of a cellular wireless system constructed according to the present invention.

FIG. 1 is a system diagram illustrating a portion of a cellular wireless system constructed according to the present invention. The cellular wireless system includes a wireless network infrastructure 102, base station controllers (BSCs) 152 and 154, and base stations 103, 104, 105, and 106. The wireless network infrastructure 102 couples to the Internet 114. The wireless network infrastructure 102 also couples to the Public Switched Telephone Network (PSTN) 110. In one embodiment of the present invention, the wireless network infrastructure 102 is circuit switched, couples directly to the PSTN 110, and couples to the Internet 114 via a gateway (G/W) 112. In another embodiment of the present invention, the wireless network infrastructure 102 is packet switched, couples directly to the Internet 114, and couples to the PSTN 110 via an interworking function (IWF) 108.

A conventional voice terminal 120 couples to the PSTN 110. A Voice over Internet Protocol (VoIP) terminal 122 and a personal computer 124 couple to the Internet 114. Wireless subscriber units 116, 118, 126, 128, 130, 132, 134, and 136 couple to the wireless system via wireless links with the base stations 103–106. As illustrated, wireless subscriber units may include cellular telephones 116 and 118, laptop computers 126 and 134, desktop computers 128 and 136, and data terminals 130 and 132. However, the wireless system supports communications with other types of wireless subscriber units as well.

Each of the base stations 103–106 services a cell/set of sectors within which it supports wireless communications. Wireless links that include both forward link components and reverse link components support wireless communications between the base stations and their serviced wireless subscriber units. These wireless links support data communications, VoIP and other multimedia communications. The teachings of the present invention may be applied equally to any type of packetized communication.

The cellular wireless system operates according to a CDMA standard that has been modified according to the present invention, e.g., 1×RTT (including CDMA 2000A and CDMA 2000B operations), W-CDMA, or another CDMA standard that has been modified according to the operations described herein. The cellular wireless system supports both voice and data traffic. However, operations according to the present invention relate to the service of high-rate data communications. As is generally known, devices such as laptop computers 126 and 134, desktop computers 128 and 136, data terminals 130 and 132, and cellular telephones 116 and 118, are enabled to "surf" the internet 114, transmit and receive data communications such as email, transmit and receive files, and to perform other data operations. Many of these data operations have significant download data-rate requirements while the upload data-rate requirements are not as severe.

A user of a particular wireless subscriber unit may subscribe to a service that provides a relatively high bandwidth of capacity. In order to service these high-speed data communication requirements, in particular the larger download data-rate requirements, the IS-95B and 1×RTT standards contemplate multiple download channels, i.e., fundamental traffic channels (FCHs) and supplemental traffic channels (SCHs). The SCH is a channel that is allocated to a particular wireless subscriber unit to augment the FCH. In some standards, the SCH provides variable rate data service, e.g., 19.2 kbps, 38.4 kbps, 76.8 kbps, 153.6 kbps, and 307.2 kbps, among other data rates.

The data rate that can be provided via a particular SCH is based upon the signal quality as seen by a serviced wireless subscriber unit. The signal quality will depend upon the distance of the wireless subscriber unit from its servicing base station, the maximum transmit power that the servicing base station can provide for the channel, the propagation path characteristics from the base station to the wireless subscriber unit, and the noise present at the wireless subscriber unit, among other factors. Thus, if the signal quality that may be provided is high, the SCH will support a relatively higher data rates by using a relatively higher symbol rate. If the signal quality that may be provided is low, the SCH will support a relatively lower data rate by using a lower symbol rate.

Various standardized techniques have been developed to select a supportable data rate that may be supported for a particular serviced wireless subscriber unit. One such technique is included in the operations referred to as the Radio Resource Management (RRM) operations. Using the RRM operations, considering the signal quality available as well as a number of other considerations, a supportable data rate for the SCH is determined. Considerations in determining the supportable data rate include the available transmit power, system-wide interference levels, resources available in the BSC and base station, and other considerations. The supportable data rate for the given channel is expected to yield a particular Frame Error Rate (FER) for serviced physical layer data frames, e.g., 1%, 5%, etc. In a conventional system, the supportable data rate is used for the SCH and provides data throughput at the supportable data rate with the expected FER.

Thus, for example, if data terminal 132 is downloading a large data file, receiving streaming audio, or watching an audiovisual presentation, for example, base station 105 will service its wireless data communications. Both the FCH and one or more SCHs are employed to service this wireless data communication for the data terminal 132. Using conventional techniques, the RRM operations would yield a supportable data rate to use for the SCH servicing the data communications. At this supportable data rate for the SCH, an expected FER would result, e.g., 1%, 5%, etc. The BSC 152 and the base station 105 would work in cooperation to service these data communications at the supportable data rate.

Operation according to the present invention, however, does not use the supportable data rate. According to the present invention, the supportable data is multiplied by a data rate multiplier, which is an integer greater than one, to produce a serviced data rate. Of course, the serviced data rate has an upper bound defined by the maximum data rate supported by the particular system, e.g., 153.6 kbps for a CDMA 2000A system and 307.2 kbps for a CDMA 2000B system. The serviced data rate is then used for the SCH. Further, according to the present invention, each data block of the data communication is serviced for transmission from the base station 105 to the data terminal 132 more than one time. A retransmission number may relate directly to the value of N chosen for the serviced data rate, e.g., if N=2, data is retransmitted once, if N=4, data is retransmitted three times, etc.

In one embodiment described further with reference to FIGS. 3A–6, each data block is scheduled for transmission from the base station 105 to the data terminal 132 twice, i.e., N=2. However, an immediate acknowledgement scheme is employed such that the data terminal 132 immediately notifies the base station 105 when successful receipt of particular data frames has occurred. Such notification may be serviced on a fast reverse link channel such a reverse link power control channel. If the data block is successfully received, the data block is not transmitted again and the base station does not transmit on the SCH during the second scheduled time period. When successful receipt occurs on a first transmission, system-wide interference is reduced and effective throughput increases.

With the operations of the present invention, FER increases at the physical layer because the serviced data rate exceeds the supportable data rate. However, because the serviced data rate is at least twice the supportable data rate, the throughput from the base station 105 to the data terminal 132 is the same, even with the FER increase. Thus, at the MAC layer or link layer, the Packet Error Rate (PER) will typically decrease as compared to operation at the supportable data rate. Further, because the SCH transmissions from the base station 105 to the data terminal 132 are idle for some time periods, system-wide interference decreases, FER for other communications decreases, and overall system performance increases.

Figure 2:
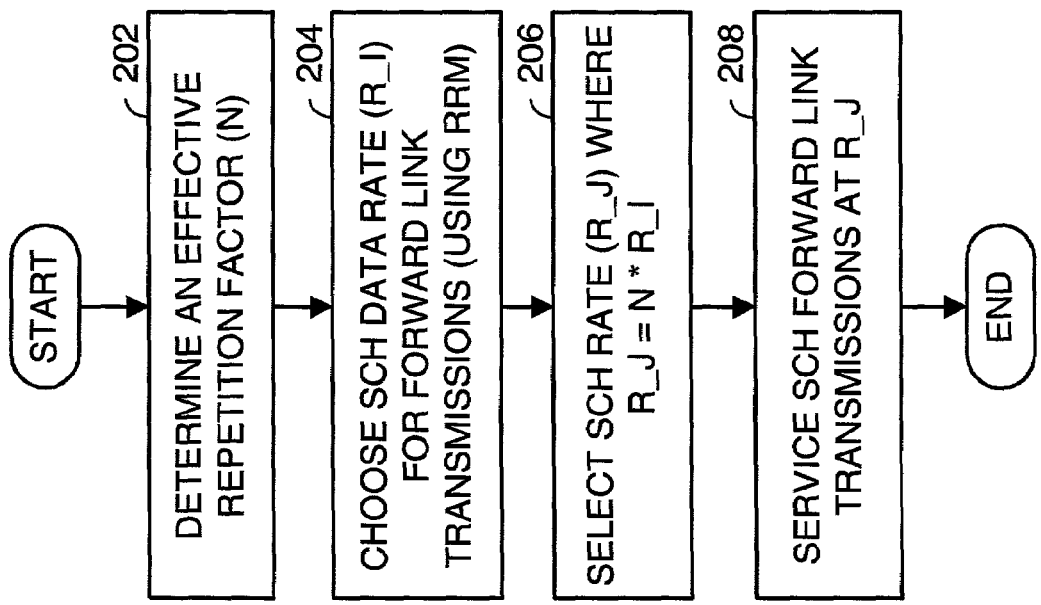
FIG. 2 is a logic diagram illustrating operation according to the present invention.

FIG. 2 is a logic diagram illustrating operation according to the present invention. In a first operation, a base station controller or other cellular wireless communication system component determines an effective repetition factor (N) (step 202). The effective repetition factor is an integer having a value greater than 1. Typical values of the effective repetition factor according to the present invention are 2, 4, 8, . . . , N. An upper bound of the serviced data rate will correspond to the maximum data rate supported by the particular system.

Then, for the particular embodiment of FIG. 2 in which a SCH is operated according to the present invention, a data rate for the supplement channel is determined using prior techniques (step 204). One prior technique that may be employed for selecting a data rate for the SCH is performed according to RRM operations. RRM operations are generally known and are not described further herein except as to expand or clarify the teachings of the present invention. The data rate chosen at step 204 is one that would be selected according to prior operations and is denoted as R_I. This data rate would be used in a prior system for the SCH.

However, according to the present invention, the SCH data rate R_I is not employed because a higher data rate is used. In particular, operation according to the present invention selects a SCH rate (R_J) that is equal to the effective repetition factor N times the prior SCH data rate R_I. Thus, R_J is equal to N*R_I (step 206). The upper value of R_J is limited by the maximum data rate supported by the particular system. In one particular example that will be described further herein with reference to FIGS. 5 and 6, the data rate R_I is equal to 38 kbps, while the data rate R_J is equal to 76 kbps. In such case, the effective repetition factor N is equal to 2.

With the service data rate chosen to be R_J, the SCH forward link transmissions from the base station to the wireless subscriber unit are serviced at the transmission rate of R_J (step 208). Operations at step 208 at the data rate of R_J continue until the high-speed data communication is serviced to completion. As will be appreciated, the SCH in a 2.5G or 3G system is one that can be allocated and deallocated based upon the transmission requirements for the link. Thus, the SCH may be used according to the present invention as required to service the data communication in excess of the capacity of the fundamental traffic channel.

Figure 3B:
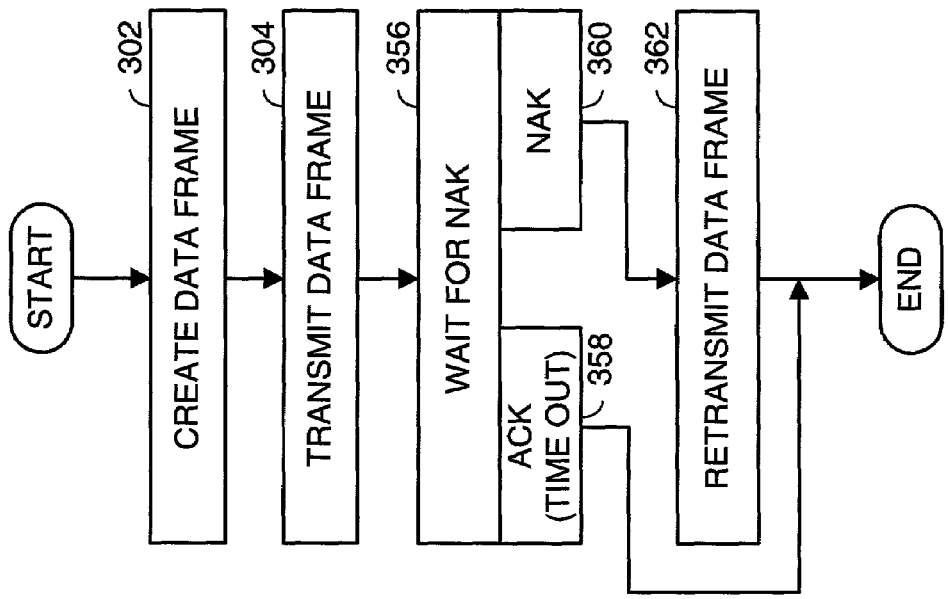
FIGS. 3A and 3B are logic diagrams illustrating operation of a base station controller and base station in transmitting a data frame to a wireless subscriber unit.
Figure 3A:
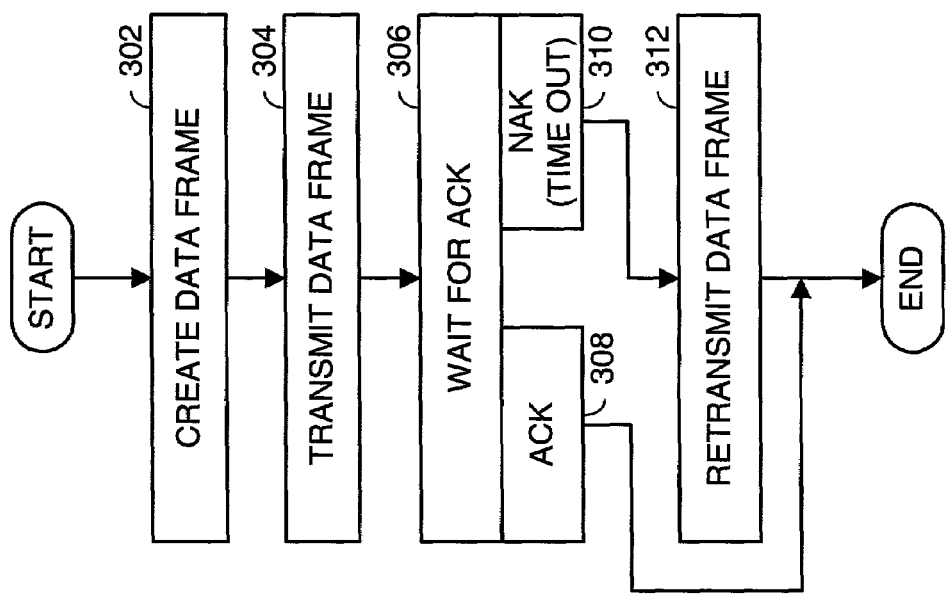

FIGS. 3A and 3B are logic diagrams illustrating operation of a base station controller and base station in transmitting a data frame to a wireless subscriber unit. The operation of FIG. 3A or FIG. 3B will be employed for each data frame transmitted to the wireless subscriber unit. Referring particularly to FIG. 3A, operation commences wherein the data frame is created (step 302). As will be described with reference to FIGS. 5 and 6, multiple data blocks may be contained in a single physical layer data frame ("data frame"). As is appreciated, as the data rate of a channel increases so does the amount of data carried in each data frame. Generally speaking, the amount of data carried by each data frame increases proportionally with the data rate.

After the data frame is created it is transmitted from the base station to the wireless subscriber unit (step 304). After the base station controller and base station transmit the data frame to the wireless subscriber unit, it/they wait for an acknowledgment of successful positive acknowledgement (ACK) of receipt of the data frame (step 306). A fast reverse link channel, such as the reverse link power control channel, is required to carry the ACK (or NAK). If an ACK is received (step 308) operation ends for the particular data frame. However, if a negative acknowledgment (NAK) is received or a time-out occurs (step 310) then the data frame is retransmitted during a retransmission period that has been scheduled for the particular data frame. From step 312 and step 308, operation ends.

Referring now to FIG. 3B, the operations similar to FIG. 3A are described. The operation of FIG. 3B differs in the manner in which the base station controller and base station retransmit the data frame to the wireless subscriber unit. As was the case with FIG. 3A, a fast reverse link channel must be available for the transmission of the ACK or the NAK. Such is the case because a relatively quick acknowledgment or negative acknowledgment must be received by the base station and base station controller in order to preclude retransmission of the particular data frame if it has been successfully received by the wireless subscriber unit.

Thus, at step 356, as contrasted to step 306 of FIG. 3A, the base station controller and base station wait for a NAK (step 356). If an ACK is received or if a time-out period occurs (step 358) operation ends for the particular data frame. However, if a NAK is received (step 360), the data frame is retransmitted at the scheduled transmission time (step 362). From step 362 and step 358, operation ends.

Figure 4:
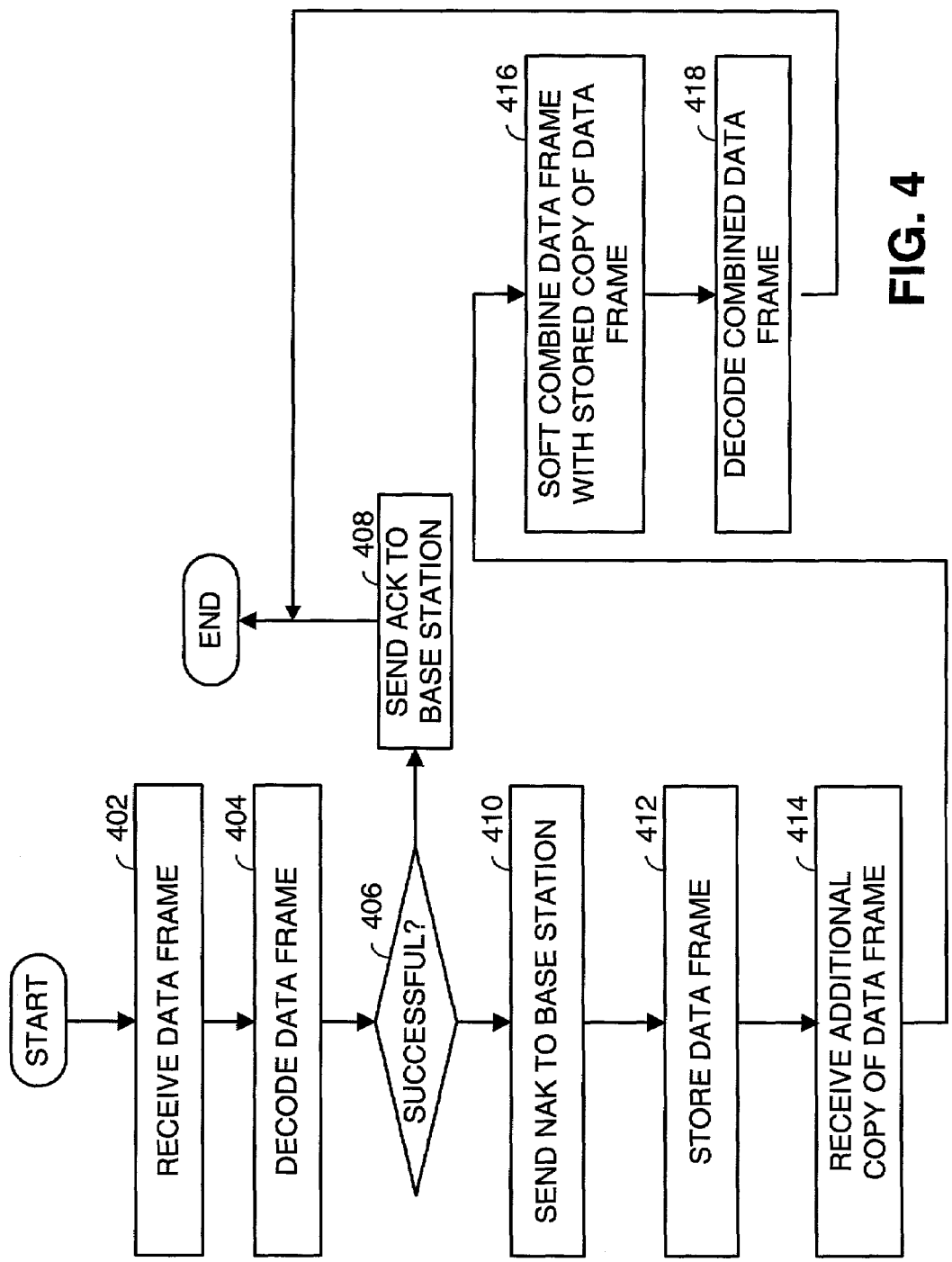
FIG. 4 is a logic diagram illustrating operation of a wireless subscriber unit according to the present invention in receiving high-speed data communications.

The operation of FIGS. 3A, 3B, and 4 may be performed using only ACKs or NAKs. In such case, if an ACK is received (or no NAK is received), no subsequent transmission of the data frame is performed. Alternately, if a NAK is received (or no ACK is received), subsequent transmission of the data frame is performed.

FIG. 4 is a logic diagram illustrating operation of a wireless subscriber unit according to the present invention in receiving high-speed data communications. The operation of FIG. 4 relates to the receipt and decoding of a particular data frame that is transmitted from the base station controller and base station according to the present invention. The operation of FIG. 4 will be employed for each data frame transmitted to the wireless subscriber unit from the base station.

For the particular data frame, the wireless subscriber unit receives the data frame across a wireless link from the base station (step 402). The wireless subscriber unit then attempts to decode the data frames (step 404). If the data frame decoding is successful, as determined (step 406), the wireless subscriber unit responds to the base station with an ACK (step 408) and operation ends for the particular data frame.

However, if the decoding of the particular data frame is unsuccessful, the wireless subscriber unit responds to the base station with a NAK (step 410). Further, the wireless subscriber unit stores the data frame for use in an optimal combining operation (step 412). Then, the wireless subscriber unit receives an additional copy of the data frame (step 414) and performs soft combining operation of the stored data frame with the additional copy of the data frame received (step 416). After the optimal combining operation, the wireless subscriber unit attempts to decode the optimally combined data frame (step 418). After step 418, operation ends for the particular data frame.

As will be appreciated by the reader, the principles of the present invention may be extended to include multiple retransmissions/receipts of the data frame from the base station to the wireless subscriber unit. Each time that the data frame is retransmitted to the wireless subscriber unit from the base station, the wireless subscriber unit will optimally combine the received data frame with prior stored copies of the data frame or prior stored optimally combined copies of the data frame. After this optimal combining operation, the wireless subscriber unit will then attempt to successfully decode the data frame.

Figure 5:
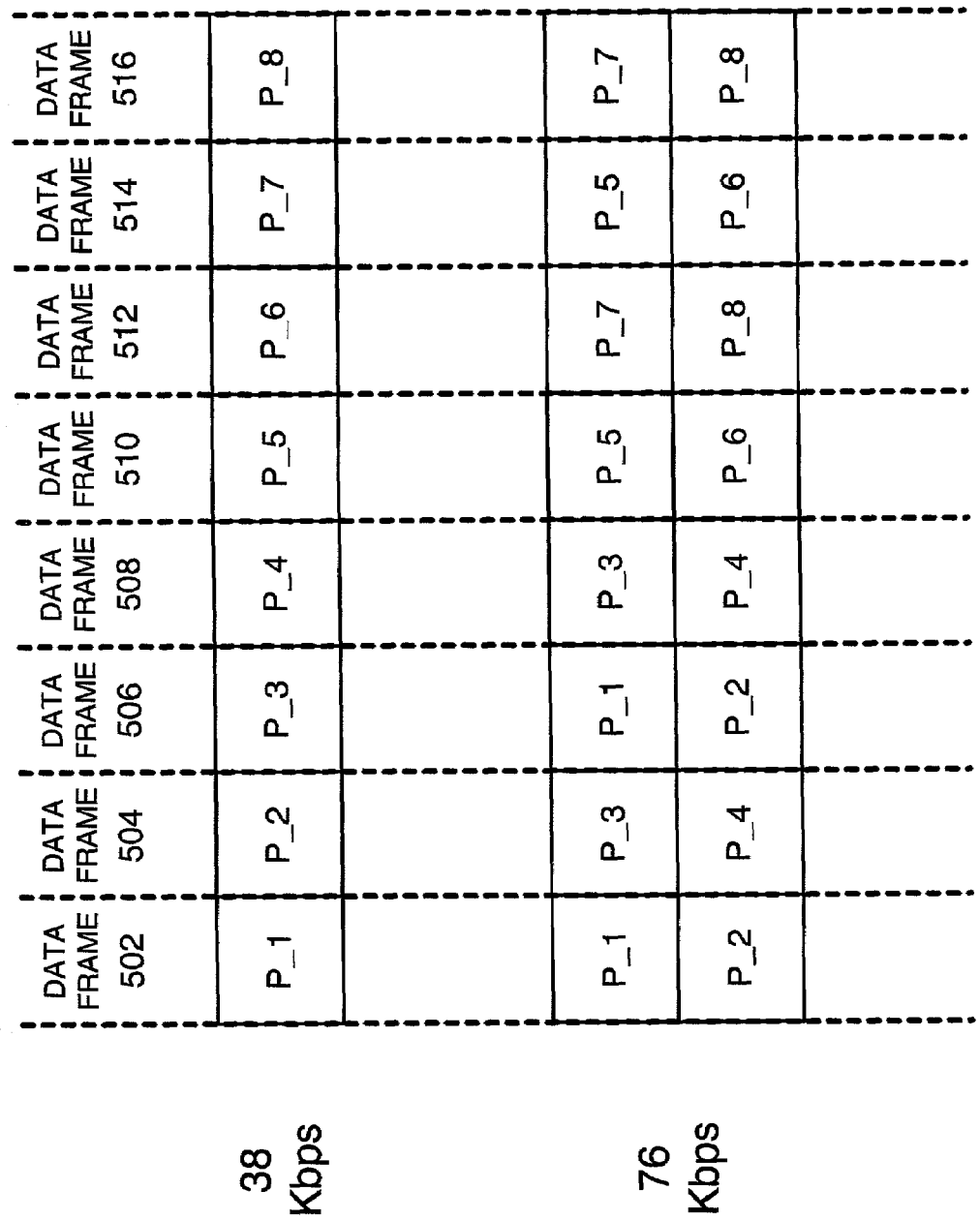
FIG. 5 is a diagram illustrating transmission of data frames and data contained therein according to both a prior art technique and operation according to the present invention.

FIG. 5 is a diagram illustrating transmission of data frames and data contained therein according to both a prior art technique and operation according to the present invention. As shown in FIG. 5, a number of successive time intervals 502–516 correspond to particular data frames. Each data block transmitted from a servicing base station to a wireless subscriber unit is referred to individually, i.e., P_1, P_2, P_3 P_4, P_5, P_6, P_7 and P_8. According to a prior art operation at 38 kbps, each data frame 502 through 516 corresponds to a particular data group P_1 through P_8, respectively.

According to the present invention, however, operation is performed in which transmissions from the base station at the wireless subscriber unit occur at 76 kbps. Thus, at this data rate, the data rate multiplier is 2, and for each data frame twice as much data is transmitted from the base station to the wireless subscriber unit. Thus, in such case, during data frame 502, data groups P_1 and P_2 are transmitted from the base station to the wireless subscriber unit. Then, during data frame 504, data groups P_3 and P_4 are transmitted from the base station to the wireless subscriber unit. In this fashion, each data frame carries two data groups.

According to the present invention, however, each data group is scheduled for transmission from the base station to the wireless subscriber unit twice. Thus, is as shown, in data frame 506, data groups P_1 and P_2 are again transmitted from the base station to the wireless subscriber unit. Further, in data frame 508, data groups P_3 and P_4 are retransmitted from the base station to the wireless subscriber unit. Likewise, in data frames 510 and 514, data groups P_5 and P_6 are transmitted and retransmitted from the base station to the wireless subscriber unit, respectively. Likewise, in data frames 512 and 516, data groups P_7 and P_8 are transmitted and retransmitted from the base station to the wireless subscriber unit, respectively.

Figure 6:
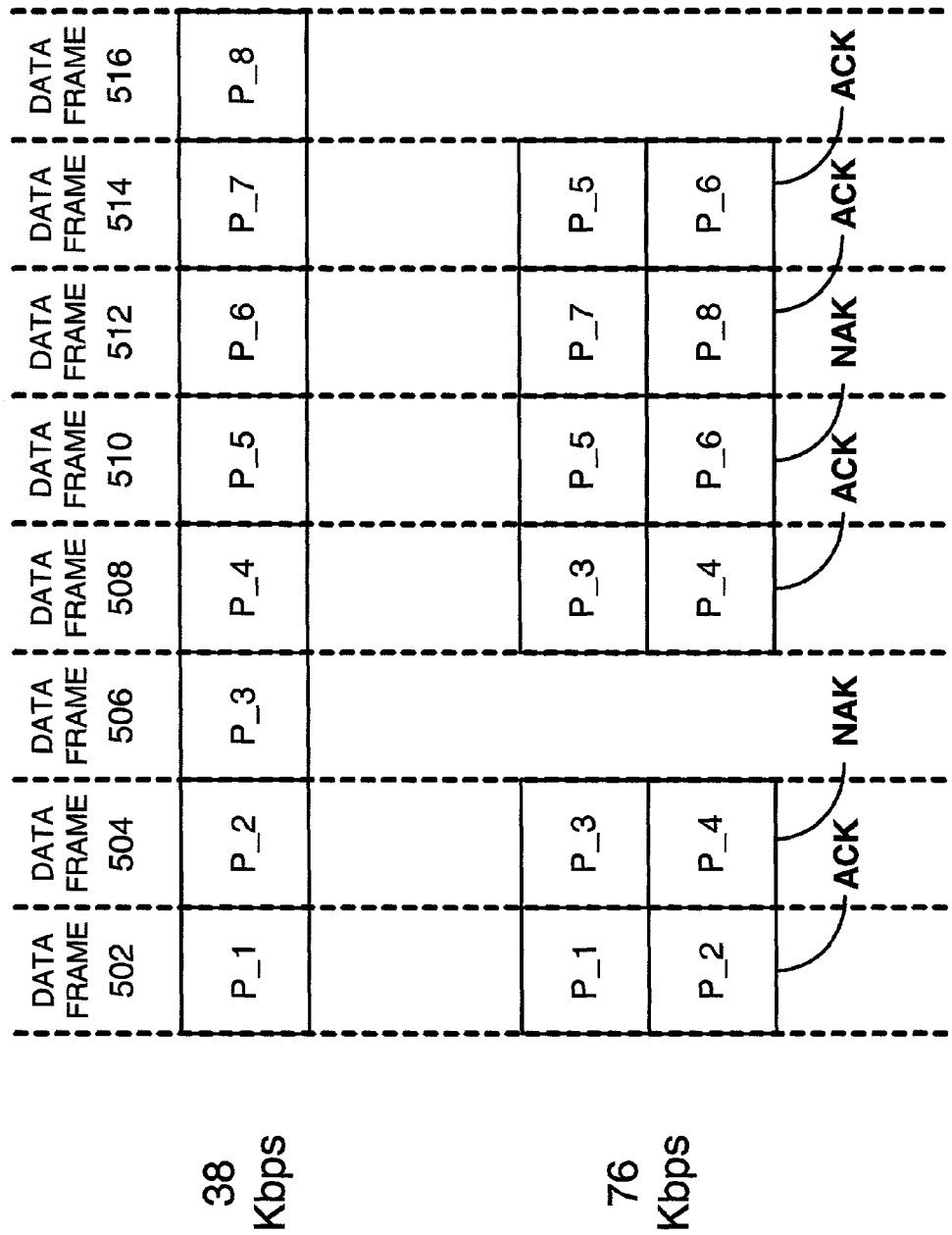
FIG. 6 is a diagram illustrating transmissions according to the present invention based upon the scheduled transmissions of FIG. 5.

FIG. 6 is a diagram illustrating transmissions according to the present invention based upon the scheduled transmissions of FIG. 5. As is shown, in data frame 502, data groups P_1 and P_2 are transmitted from the base station to the wireless subscriber unit. Further, in data frame 504, data groups P_3 and P_4 are transmitted from the base station to the wireless subscriber unit. In response to the transmission of data frame 502, the wireless subscriber unit sends an ACK to the base station indicating successful receipt of data frame 502, including data groups P_1 and P_2. Thus, during the period reserved for data frame 506 in which a retransmission of data groups P_1 and P_2 would have been performed, the gain of the base station transmitter for the particular SCH is set to zero such that no transmissions occur. Thus, in data frame 506, no data is transmitted and interference with other transmissions is reduced.

As is shown, a NAK is sent from the wireless subscriber unit to the base station in response to an unsuccessful decoding of data groups P_3 and P_4 of data frame 504. Thus, in data frame 508, data groups P_3 and P_4 are retransmitted from the base station to the wireless subscriber unit. In response to a successful decoding, the wireless subscriber unit responds to the base station with an ACK.

In data frame 510, data groups P_5 and P_6 are transmitted from the base station to the wireless subscriber unit. The data groups P_5 and P_6 are not successfully decoded and the wireless subscriber unit responds to the base station with a NAK. Thus, in data frame 514, data groups P_5 and P_6 are retransmitted from the base station to the wireless subscriber unit. In response, the wireless subscriber unit responds with an ACK.

In data frame 512, data groups P_7 and P_8 are transmitted from the base station to the wireless subscriber unit. Based upon a successful decoding of data frame 512, including data groups P_7 and P_8, the wireless subscriber unit responds to the base station with an ACK. Thus, during the time corresponding to data frame 516, the gain of the transmitter of the base station for the particular SCH is set to zero and no transmissions occur, thus minimizing interference with other transmissions.

Figure 7:
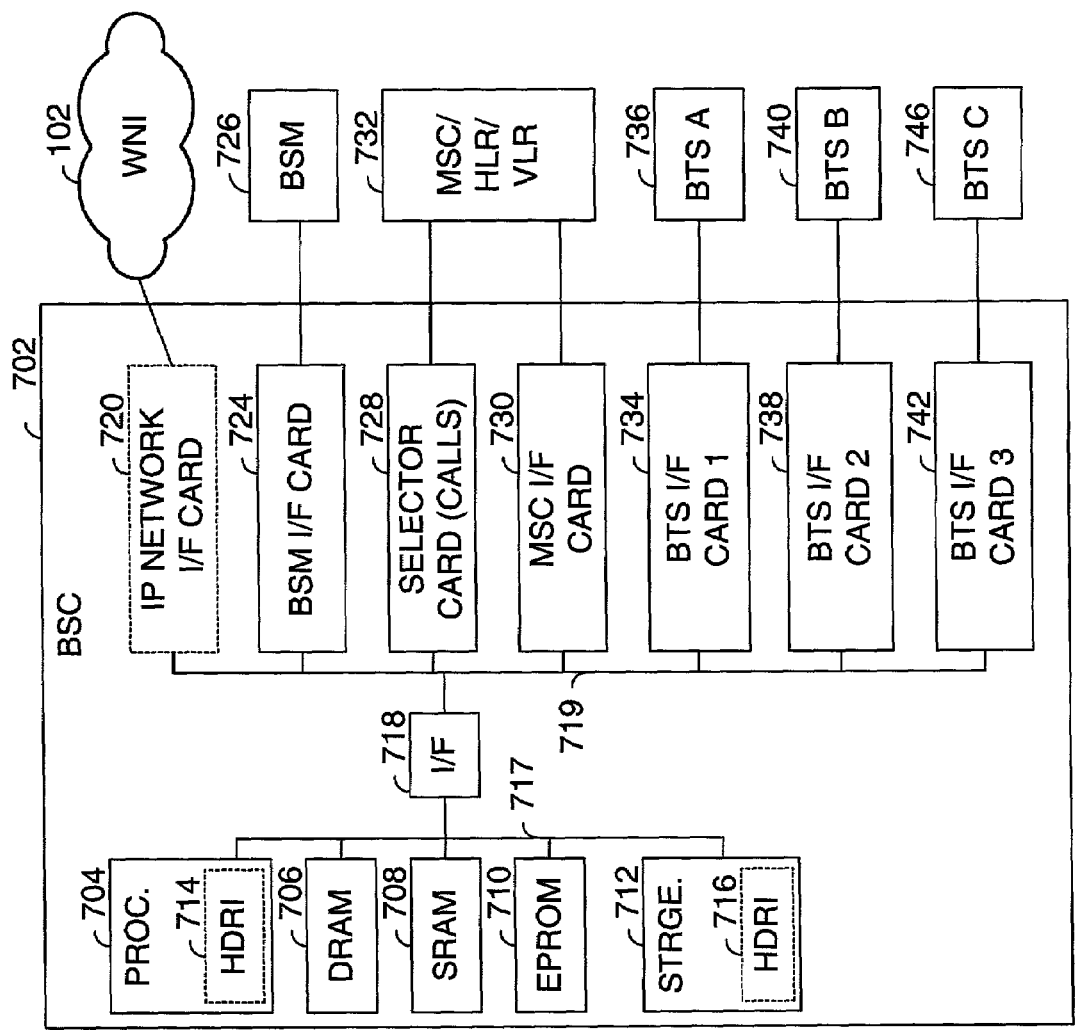
FIG. 7 is a block diagram illustrating a Base Station Controller (BSC) constructed according to the present invention.

FIG. 7 is a block diagram illustrating a Base Station Controller (BSC) 702 constructed according to the present invention. The structure and operation of BSCs is generally known. The BSC 702 services circuit switched and/or packet switched operations. In some cases, the BSC 702 is called upon to convert data between circuit switched and data switched formats, depending upon the types of equipment coupled to the BSC 702. The components illustrated in FIG. 7, their function, and the interconnectivity may vary without departing from the teachings of the present invention.

The BSC 702 includes a processor 704, dynamic RAM 706, static RAM 708, EPROM 710, and at least one data storage device 712, such as a hard drive, optical drive, tape drive, etc. These components intercouple via a local bus 717 and couple to a peripheral bus 719 via an interface 718. Various peripheral cards couple to the peripheral bus 719. These peripheral cards include an IP network interface card 720, a base station manager interface card 724, at least one selector card 728, an MSC interface card 730, and a plurality of BTS interface cards 734, 738 and 742.

The IP network interface card 720 couples the BSC 702 to wireless network infrastructure 102. The base station manager interface card 724 couples the BSC 702 to a Base Station Manager 726. The selector card 728 and MSC interface card 730 couple the BSC 702 to an MSC/HLR/VLR 732. The BTS interface cards 734, 738, and 742 couple the BSC 702 to base stations served by Base station Transceiver Subsystems (BTSs) 736, 740, and 746, respectively.

Hybrid Data Rate Instructions (HDRI) 716 and 714, along with the BSC 702 hardware, enable the BSC 702 to perform the operations of the present invention. The HDRI 716 are loaded into the storage unit 712 and, upon their execution, some or all of the HDRI 714 are loaded into the processor 704 for execution. During this process, some of the HDRI 716 may be loaded into the DRAM 706.

Figure 8:
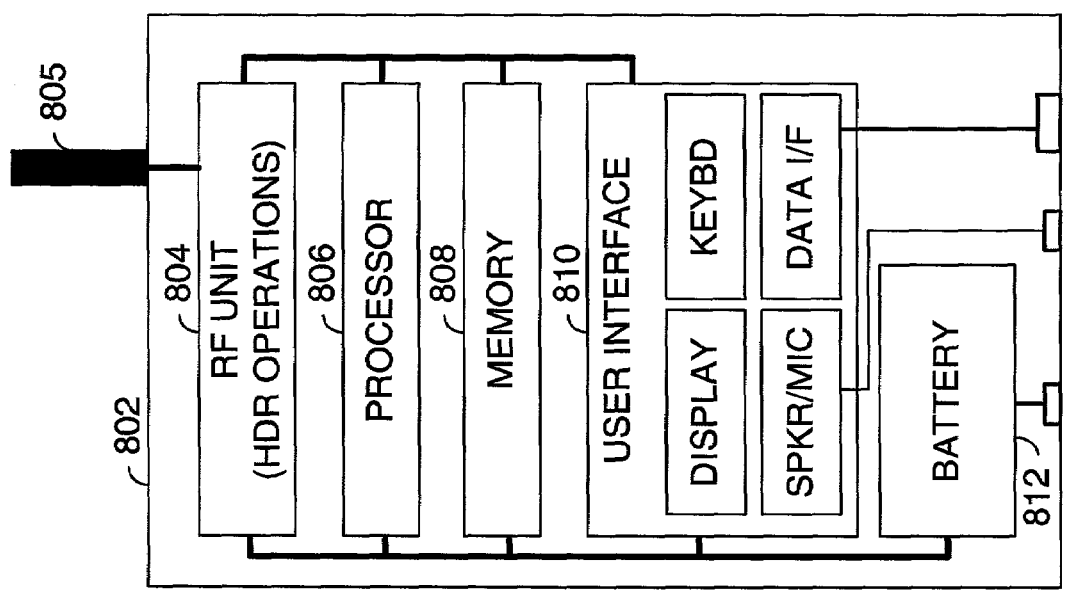
FIG. 8 is a block diagram illustrating the structure of a wireless subscriber unit constructed according to the present invention.

FIG. 8 is a block diagram illustrating the structure of a wireless subscriber unit 802 constructed according to the present invention. The wireless subscriber unit 802 operates with a cellular wireless system, such as that described with reference to FIG. 1 and according to the operations described with reference to FIGS. 2–6. The wireless subscriber unit 802 includes an RF unit 804, a processor 806, and a memory 808. The RF unit 804 couples to an antenna 805 that may be located internal or external to the case of the wireless subscriber unit 802. The processor 806 may be an Application Specific Integrated Circuit (ASIC) or another type of processor that is capable of operating the wireless subscriber unit 802 according to the present invention. The memory 808 includes both static and dynamic components, e.g., DRAM, SRAM, ROM, EEPROM, etc. In some embodiments, the memory 808 may be partially or fully contained upon an ASIC that also includes the processor 806. A user interface 810 includes a display, a keyboard, a speaker, a microphone, and a data interface, and may include other user interface components. The RF unit 804, the processor 806, the memory 808, and the user interface 810 couple via one or more communication buses/links. A battery 812 also couples to and powers the RF unit 804, the processor 806, the memory 808, and the user interface 810.

The wireless subscriber unit 802 operates according to the present invention as previously described. The structure of the wireless subscriber unit 802 illustrated is only an example of one wireless subscriber unit structure. Many other varied wireless subscriber unit structures could be operated according to the teachings of the present invention.

Figure 9:
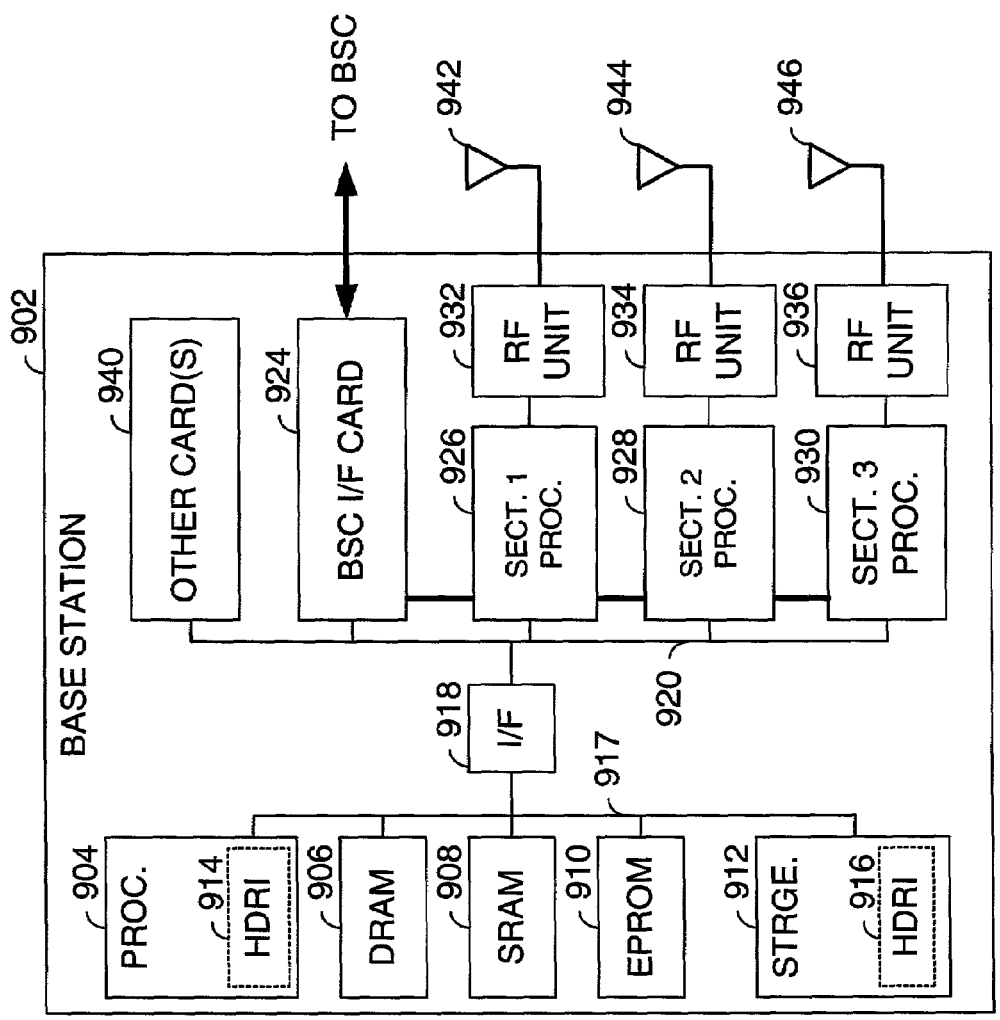
FIG. 9 is a block diagram illustrating the structure of a base station constructed according to the present invention.

FIG. 9 is a block diagram illustrating the structure of a base station 902 constructed according to the present invention. The base station 902 includes a processor 904, dynamic RAM 906, static RAM 908, EPROM 910, and at least one data storage device 912, such as a hard drive, optical drive, tape drive, etc. These components (which may be contained on a peripheral processing card or module) intercouple via a local bus 917 and couple to a peripheral bus 920 (which may be a back plane) via an interface 918. Various peripheral cards couple to the peripheral bus 920. These peripheral cards include a BSC interface card 924, which couples the base station 902 to its servicing BSC.

Digital processing cards 926, 928 and 930 couple to Radio Frequency (RF) units 932, 934, and 936, respectively. Each of these digital processing cards 926, 928, and 930 performs digital processing for a respective sector, e.g., sector 1, sector 2, or sector 3, serviced by the base station 902. The RF units 932, 934, and 936 couple to antennas 942, 944, and 946, respectively, and support wireless communication between the base station 902 and wireless subscriber units. Further, the RF units 932, 934, and 936 operate according to the present invention. The base station 902 may include other card(s) 940 as well.

Hybrid Data Rate Instructions (HDRI) 916 and 194 enable the BSC 902 to perform the operations of the present invention. The HDRI 916 are loaded into the storage unit 912 and, upon their execution, some or all of the HDRI 914 are loaded into the processor 904 for execution. During this process, some of the HDRI 916 may be loaded into the DRAM 906.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A method for servicing data communications in a cellular wireless communication system, the method comprising:
    determining that a wireless subscriber unit requires data service;
    determining a supportable data rate for the wireless subscriber unit based upon forward link quality and available base station resources;
    determining a data rate multiplier that is greater than one;
    determining a serviced data rate that is equal to the supportable data rate times the data rate multiplier; and
    transmitting data communications from the base station to the wireless subscriber unit at the serviced data rate.

2. The method of claim 1, further comprising:
    for each data frame of the high-speed data communications, scheduling transmission of the data frame from the base station to the wireless subscriber unit a plurality of times;
    receiving an indication from the wireless subscriber unit that a particular data frame has been successfully received;
    during a time period in which the particular data frame was scheduled for an additional transmission from the base station to the wireless subscriber unit, not transmitting the particular data frame; and
    by not transmitting the particular data frame from the base station, interference with other transmissions is reduced.

3. The method of claim 2, wherein when the base station is not transmitting to the wireless subscriber unit during the time period in which the particular data frame was scheduled for an additional transmission, the base station sets its transmit gain to zero for the data frame.

4. The method of claim 2, wherein the indication from the wireless terminal that the particular data frame has been successfully received comprises receiving an acknowledgement (ACK) corresponding to the particular data frame.

5. The method of claim 2, wherein the indication from the wireless terminal that the particular data frame has been successfully received comprises non-receipt of a non-acknowledgement (NAK) corresponding to the particular data frame.

6. The method of claim 1, wherein the supportable data rate for the wireless subscriber unit is determined using a Radio Resource Management (RRM) algorithm.

7. The method of claim 1, wherein the data communications are serviced according to a Code Division Multiple Access (CDMA) protocol.

8. The method of claim 7, wherein the data communications are serviced on a supplemental channel (SCH).

9. The method of claim 1, wherein:
    the data communications are serviced according to a Code Division Multiple Access (CDMA) protocol;
    the data communications are serviced on a supplemental channel (SCH); and
    the supportable data rate and the serviced data rate are selected from the group consisting of 19.2 kbps, 38.4 kbps, 76.8 kbps, 153.6 kbps, and 307.2 kbps.

10. The method of claim 1, wherein:
    the supportable data rate is 19.2 kbps;
    the data rate multiplier is selected from the group consisting of 2, 4, 6, and 16; and
    the serviced data rate is selected from the group consisting of 38.4 kbps, 76.8 kbps, 153.6 kbps, and 307.2 kbps.

11. A method for servicing data communications in a cellular wireless communication system, the method comprising:
    determining that a wireless subscriber unit requires data service;
    determining a supportable data rate for the wireless subscriber unit based upon forward link quality and available base station resources;
    determining a data rate multiplier that is greater than one;
    determining a serviced data rate that is equal to the supportable data rate times the data rate multiplier;
    for each data frame of the high-speed data communications, scheduling transmission of the data frame from the base station to the wireless subscriber unit a plurality of times;
    transmitting data communications from the base station to the wireless subscriber unit at the serviced data rate;
    receiving an indication from the wireless subscriber unit that a particular data frame has been successfully received;
    during a time period in which the particular data frame was scheduled for an additional transmission from the base station to the wireless subscriber unit, not transmitting the particular data frame; and
    by not transmitting the particular data frame from the base station, interference with other transmissions is reduced.

12. The method of claim 11, wherein when the base station is not transmitting to the wireless subscriber unit during the time period in which the particular data frame was scheduled for an additional transmission, the base station sets its transmit gain to zero for the data frame.

13. The method of claim 11, wherein the indication from the wireless terminal that the particular data frame has been successfully received comprises receiving an acknowledgement (ACK) corresponding to the particular data frame.

14. The method of claim 11, wherein the indication from the wireless terminal that the particular data frame has been successfully received comprises non-receipt of a non-acknowledgement (NAK) corresponding to the particular data frame.

15. The method of claim 11, wherein the supportable data rate for the wireless subscriber unit is determined using a Radio Resource Management (RRM) algorithm.

16. The method of claim 11, wherein the data communications are serviced according to a Code Division Multiple Access (CDMA) protocol.

17. The method of claim 16, wherein the data communications are serviced on a supplemental channel (SCH).

18. The method of claim 11, wherein:
the data communications are serviced according to a Code Division Multiple Access (CDMA) protocol;
the data communications are serviced on a supplemental channel (SCH); and
the supportable data rate and the serviced data rate are selected from the group consisting of 19.2 kbps, 38.4 kbps, 76.8 kbps, 153.6 kbps, and 307.2 kbps.

19. The method of claim 11, wherein:
the supportable data rate is 19.2 kbps;
the data rate multiplier is selected from the group consisting of 2, 4, 6, and 16; and
the serviced data rate is selected from the group consisting of 38.4 kbps, 76.8 kbps, 153.6 kbps, and 307.2 kbps.

20. A base station controller operating within a cellular wireless communication system, the base station controller comprising:
a data network interface that receives blocks of packetized forward link data intended for the wireless subscriber unit;
a base station interface that interfaces the base station controller to a plurality of base stations; and
at least one digital processor coupled to the data network interface and the base station interface that executes software instructions causing the base station controller to control the operation of the cellular wireless communication system to:
determine that a wireless subscriber unit requires data service;
determine a supportable data rate for the wireless subscriber unit based upon forward link quality and available base station resources;
determine a data rate multiplier that is greater than one;
determine a serviced data rate that is equal to the supportable data rate times the data rate multiplier; and
transmit data communications from the base station to the wireless subscriber unit at the serviced data rate.

* * * * *

UNITED STATES PATENT AND TRADEMARK OFFICE
CERTIFICATE OF CORRECTION

| | | |
|---|---|---|
| PATENT NO. | : 7,075,913 B1 | Page 1 of 1 |
| APPLICATION NO. | : 10/106464 | |
| DATED | : July 11, 2006 | |
| INVENTOR(S) | : Mehmet Yavuz and Farid T. Khafizov | |

It is certified that error appears in the above-identified patent and that said Letters Patent is hereby corrected as shown below:

TITLE PAGE
(75) Inventors: Mehmet Yavuz, Plano, TX (US); Farid T. Khafizov, Plano, TX (US).

Signed and Sealed this

Twelfth Day of December, 2006

JON W. DUDAS
*Director of the United States Patent and Trademark Office*